United States Patent [19]

Munsell

[11] 4,003,612
[45] Jan. 18, 1977

[54] FISHING TACKLE RACK

[76] Inventor: Robert F. Munsell, 516 W. Jackson Blvd., Ste. 508, Chicago, Ill. 60606

[22] Filed: Jan. 16, 1976

[21] Appl. No.: 649,655

[52] U.S. Cl. .................................. 312/245; 43/25; 211/60 R

[51] Int. Cl.² ........................................... A47F 7/00

[58] Field of Search ........ 224/5 E, 5 F, 5 J, 42.1 C; 43/21.2, 22, 25, 25.2, 26; 24/81 B, 81 A, 257, 17 B, 3 H; 312/245; 211/60 R, 60 T, 60 M, 60 G, 64, 68; 248/316

[56] References Cited

UNITED STATES PATENTS

| | | | |
|---|---|---|---|
| 424,041 | 3/1890 | Ward | 224/5 E UX |
| 2,533,541 | 12/1950 | Warring | 211/60 G X |
| 2,843,963 | 7/1958 | Butehorn | 43/25 |
| 3,128,023 | 4/1964 | Cook | 43/25 X |
| 3,135,967 | 6/1964 | Stephens | 24/3 H X |
| 3,159,939 | 12/1964 | Transeau | 43/25 X |
| 3,222,813 | 12/1965 | Buckeridge | 43/25 |
| 3,421,632 | 1/1969 | Wood | 211/60 R |
| 3,433,446 | 3/1969 | Meder | 43/22 X |
| 3,503,518 | 3/1970 | Black | 211/60 G |
| 3,731,817 | 5/1973 | Fowlkes | 211/60 R |

*Primary Examiner*—Donald A. Griffin
*Attorney, Agent, or Firm*—Henry L. Brinks

[57] ABSTRACT

A fishing tackle rack is disclosed for releasably securing fishing reels and poles. The rack includes at least one column for supporting fishing reels and having a fishing reel attachment area provided with an outer perimeter against which the yoke of the fishing reel may be releasably secured. The fishing reels are retained on the column by at least two rings composed of a resilient material and are moveable along the perimeter of the column. The rings have an inside diameter substantially equivalent to the outside diameter of the column and are adapted to be stretched to accommodate the yoke of the fishing reel. The rings secure the fishng reel to the column by slipping over end portions of the yoke of the fishing reel. Bases are provided to maintain the columns in a substantially vertical position.

1 Claim, 3 Drawing Figures

FISHING TACKLE RACK

BACKGROUND OF THE INVENTION

This invention relates to fishing tackle apparatus and more particularly, to a fishing tackle rack for mounting and storing a plurality of fishing poles and reels.

In order for the fishing poles and reels to function properly over their projected lifespan, they must be cared for properly. The fishing poles are often damaged when placed in corners or on shelves for long periods of time where they become warped if unsupported along the length of the poles. The fishing reels are often exposed to more abuse than the fishing poles when the fishing reels are placed unsecured in tackle boxes or other unsuitable places where damage may easily result to their delicate components.

BRIEF DESCRIPTION OF THE DRAWINGS

To understand this invention and the objects thereof, reference should be made to the accompanying drawings, wherein.

DETAILED DESCRIPTION OF THE INVENTION

Figure 1:
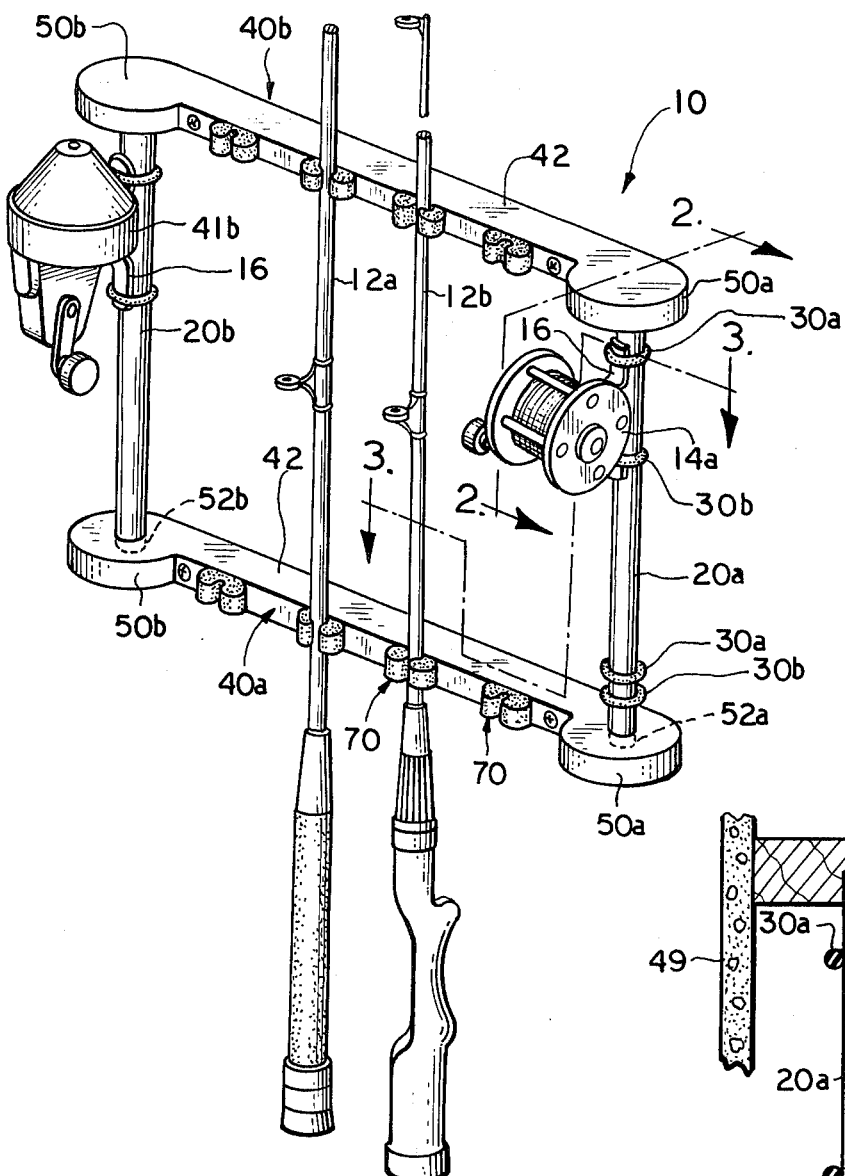
FIG. 1 is a perspective view of the present invention with fishing poles and reels mounted thereon.

Referring now to the drawings and particularly to FIG. 1, the fishing tackle rack of the present invention is represented generally by reference numeral 10. The purpose of rack 10 is to provide sufficient support for fishing tackle such as fishing poles 12a and 12b and fishing reels 14a and 14b. Rack 10 proivdes a means for storing poles 12a and 12b and reels 14a and 14b in order to properly care for such fishing tackle when not in use.

Rack 10 includes columns 20a and 20b which form sides of the rack 10. The columns 20a and 20b provide a place for mounting the 14a and 14b reels on the rack 10. Being substantially equivalent in configuration, the columns 20a and 20b have a circular cross-section and have a relatively small cross-sectional diameter when compared with their length. The columns 20a and 20b may be constructed from any material sturdy enough to support the reels 14a and 14b, and may have a solid or hollow core. In the preferred embodiment the columns 20a and 20b have a diameter of approximately ¾ inch and have a length of approximately 18 inches. The columns 20a and 20b are constructed from wood and have a solid core. Having a circular cross-section configuration enables the columns 20a and 20b to fit securely into other components of the rack 10 as hereinafter more fully described and to provide a proper mounting surface for the reels 14a and 14b.

Figure 3:
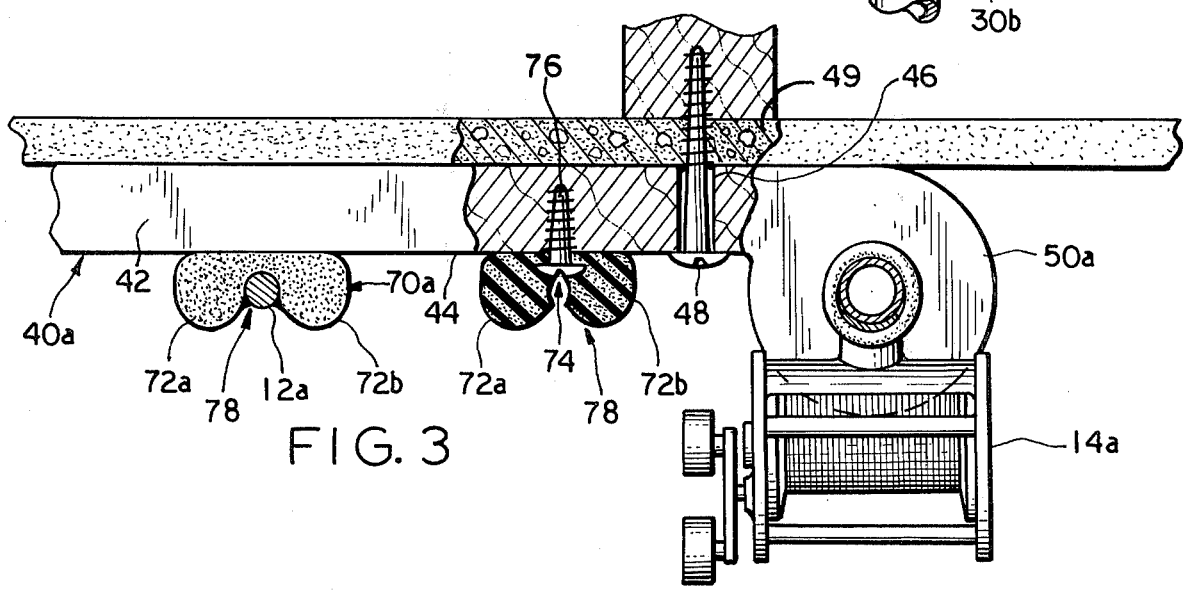
FIG. 3 is a fragmentary, enlarged view of the present invention securely retaining a fishing reel.

Now referring to FIG. 3, it will be recognized that the reel 14a is mounted on the column 20a of the rack 10. The reel 14a is secured to the column 20a by rings 30a and 30b which slip over a yoke 16 providing support for the reel 14a. The rings 30a and 30b are constructed from a resilient material and have a circular configuration. Being easily distortable, the rings 30a and 30b may assume various configurations. The inside diameter of the rings 30a and 30b is substantially equivalent to the outside diameter of the column 20a. In the preferred embodiment the rings 30a and 30b 0-rings which have an inside diameter of approximately ¾ inch.

When a person desires to mount the reel 14a on the column 20a, the rings 30a and 30b are positioned on either side of the area of the column 20a where the reel 14a is to be mounted. The rings 30a and 30b are now in a normal configuration or first position. When the person pulls a section of the ring 30a outwardly from the column 20a, the inside diameter of the ring 30a increases in size. The ring 30a now assumes a distorted shape or second position. When the inside diameter of the ring 30a is larger than the diameter of the bar 20a, the ring 30a is movable along the length of the column 20a. The person may then slip the ring 30a over one end of the yoke 16 attached to the reel 14a. When the ring 30a is slipped over the yoke 16 and the person releases it, the ring 30a will once again assume the normal configuration of first position. The ring 30b is slipped over the opposite end of the strip 16 of the reel 14a in the same manner. When the rings 30a and 30b have been slipped over the yoke 16, the reel 14a will then be securely mounted to the column 20a of the rack 10. Thus, the column 20a has provided an attachment area for mounting the reel 14a on the rack 10 and the rings 30a and 30b secure the reel 14a to the column 20a of the rack 10.

Now referring to FIG. 1, the rack 10 further includes bases 40a and 40b which form the top and bottom sides of the rack 10. The purpose of the bases 40a and 40b is to provide support for the columns 20a and 20b as well as to indirectly support the poles 12a and 12b. The bases 40a and 40b may be constructed of any solid material capable of providing such support. The bases 40a and 40b have a substantially equivalent configuration with each having a uniform height. In the preferred embodiment the bases 40a and 40b have a length of 24 inches, a width of 1 ⅛ inches at the center, and a height of ⅝ inch.

Each of the bases 40a and 40b include a center section 42 by which the rack 10 may be secured to a suitable wall 49. Positioned along an edge 44 at each end of the center section 42 are holes 46 which traverse the width of the center section 42. Screws 48 are driven through the holes 46 into the wall 49 and the rack 10 is thus firmly secured thereto.

Each of the bases 40a and 40b further include lobes 50a and 50b which are located adjacent the ends of the center section 42. The lobes 50a and 50b of the bases 40a and 40b provide support for the columns 20a and 20b. The lobes 50a and 50b have recessed areas 52a and 52b located in their centers which extend approximately half-way into the height of the lobes 50a and 50b. In the preferred embodiment, the diameter of the recessed lobes 52a and 52b is approximately ¾ inch and the depth of the recessed areas is approximately 5/16 inch. The columns 20a and 20b fit securely into the bases 40a and 40b at the recessed areas 52a and 52b which thus provide indirect support for the reels 14a and 14b on the rack 10.

Figure 2:
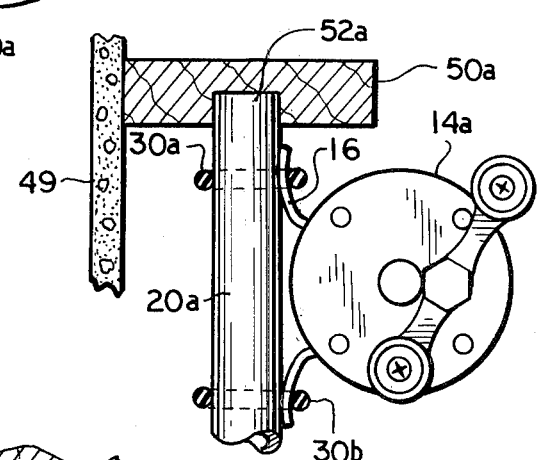
FIG. 2 is a cross-sectional view taken along the lines 2—2 in FIG. 1.

Now referring to FIG. 2, attached to the center section 42 along the edge 44 of the bases 40a and 40b are a plurality of clamps 70 which provide means for securely mounting the poles 12a and 12b in the rack 10. The clamps 70 are located on the center section 44 between the lobes 50a and 50b at regular intervals and are attached to the center section 42 by a plurality of screws 76. The clamps 70 have outer sections 72a and 72b which define a hole 74 and a channel 78 through which the poles 12a and 12b may be inserted. The clamps 70 may be constructed of a material such as rubber, sheet metal, or the like. In the preferred embodiment the solid rubber material used for construction of the clamps 70 has a resiliancy characteristic so that the clamps 70 will be able to assume a normal configuration or first position after being forced into an unnatural configuration or second position to receive the poles 12a and 12b.

The rack 10 is constructed to enable a person to mount as well as to take therefrom a pole 12a. In the preferred embodiment, the rack 10 is designed to retain the pole 12a in the center portions of the pole 12a so that the pole 12a does not warp or permanently bend in the center portions. When a person desires to mount the pole 12a on to the rack 10, the person will place the pole 12a in the channel 78 of the clamp 70a which is now in the first position. Upon forcing the pole toward the rack 10, the sections 72a and 72b will separate and the clamp 70a will assume the second position and receive the pole 12a. When the pole 12a is mounted in the hole 74, the clamp 70a will return to the first position and the pole 12a will be securely mounted within the clamp 70a. The pole 12a may be removed from the rack 10 by drawing the pole 12a in an outward direction from the rack 10. The sections 72a and 72b separate, the clamp 70a assumes a second position, and the pole 12a may be removed from the clamp 70a. When the pole 12a has been removed, the clamp 70a again will assume the first position. Thus, the clamp 70a receives and stores the pole 12a in the rack 10 as well as permitting removal therefrom.

It should be understood that various modifications of the preferred embodiments of this invention as discussed herein can be made without departing from the spirit and scope of the invention.

I claim:

1. A fishing tackle rack for releasably securing fishing reels and poles thereon, comprising:
   at least one column for supporting fishing reels, the column having a fishing reel attachment area provided with an outer perimeter against which the yoke of the fishing reel may be releasably secured;
   at least two rings composed of resilient material and movable along the perimeter of the column, the rings further having an inside diameter substantially equivalent to the outside diameter of the column and adapted to be stretched to accomodate the yoke of the fishing reel;
   whereby the two rings releasably secure the reel to the column by slipping the rings over end portions of the yoke of the fishing reel;
   two bases having recessed areas into which the end portions of the column are engageable; and
   at least one clamp rigidly attached on a side of each base adjacent the engagement of the column to the base, the clamp being adapted to receive and retain a fishing pole.

* * * * *